United States Patent [19]

Hill

[11] Patent Number: 5,498,400

[45] Date of Patent: Mar. 12, 1996

[54] PREPARATION OF THIONYL CHLORIDE AND PHOSPHORUS OXYHLORIDE FROM SULFUR DIOXIDE

[75] Inventor: John E. Hill, West Lafayette, Ind.

[73] Assignee: Great Lakes Chemical Corporation, West Lafayette, Ind.

[21] Appl. No.: 188,308

[22] Filed: Jan. 28, 1994

[51] Int. Cl.$^6$ ............................ C01B 17/45; C01B 25/10
[52] U.S. Cl. ...................................... 423/300; 423/468
[58] Field of Search ...................... 422/132, 234; 423/300, 468, 659, DIG. 9

[56] References Cited

U.S. PATENT DOCUMENTS

| | | |
|---|---|---|
| 1,753,754 | 4/1930 | Schudel . |
| 1,765,688 | 6/1930 | McKee et al. .......................... 423/468 |
| 1,788,959 | 1/1931 | Schudel . |
| 3,771,966 | 11/1973 | Hutson et al. ........................ 422/132 |
| 4,388,290 | 6/1983 | Jonas ..................................... 423/468 |

FOREIGN PATENT DOCUMENTS 415312  11/1924  Germany .

*Primary Examiner*—Wayne Langel
*Attorney, Agent, or Firm*—Woodard, Emhardt, Naughton, Moriarty & McNett

[57] ABSTRACT

A process to manufacture high purity thionyl chloride and phosphorus oxychloride utilizing a fluctuating flow of sulfur dioxide. Chlorine, sulfur dioxide, and phosphorus trichloride are reacted in a process that limits the amount of sulfuryl chloride and/or phosphorus trichloride remaining in the product stream. $Cl_2$ and $SO_2$ are first reacted to form $SO_2Cl_2$, which, in turn, is reacted with excess $PCl_1$ to form the products, $POCl_3$ and $SOCl_2$. Any excess $PCl_3$ is then reacted with additional $Cl_2$ and $SO_2$ to form additional product. Alternatively, $Cl_2$, $SO_2$, and $PCl_{13}$ are reacted directly to form $POCl_3$ and $SOCl_2$ without the formation of any $SO_2Cl_2$ intermediate by utilizing a continuous stirred loop reactor.

15 Claims, 2 Drawing Sheets

PREPARATION OF THIONYL CHLORIDE AND PHOSPHORUS OXYHLORIDE FROM SULFUR DIOXIDE

BACKGROUND OF THE INVENTION

This invention relates generally to a process for synthesizing thionyl chloride and phosphorus oxychloride, and more particularly to a process capable of utilizing a fluctuating supply of sulfur dioxide to synthesize thionyl chloride and phosphorus oxychloride.

Sulfur dioxide is a by-product generated by many industrial processes, typically including processes requiring thionyl chloride. Most of this waste sulfur dioxide is condensed and disposed at considerable cost. As a result, it would be economically and environmentally advantageous to convert waste sulfur dioxide to usable products such as thionyl chloride and phosphorus oxychloride.

Thionyl chloride, $SOCl_2$, and phosphorus oxychloride, $POCl_3$, are obtainable from sulfur dioxide. A first synthetic route reacts sulfuryl chloride, $SO_2Cl_2$ (readily formed from $SO_2$ and $Cl_2$) with phosphorus trichloride as described by Krumbiegel in German Patent 415,312:

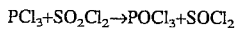

A second synthetic route reacts chlorine, sulfur dioxide, and phosphorus trichloride as described by Schudel in U.S. Pat. Nos. 1,753,754 and 1,788,959:

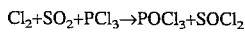

However, the $SOCl_2$ and $POCl_3$ obtained from either batch reaction is difficult to separate from unreacted $PCl_3$ or $SO_2Cl_2$ due to the relatively similar boiling points involved. The boiling point of sulfuryl chloride is 69° C., phosphorus trichloride 76° C., thionyl chloride 79° C., and phosphorus oxychloride 107° C. $PCl_3$ or $SO_2Cl_2$ contamination in the product mixture renders the recovery of high purity $SOCl_2$ and $POCl_3$ economically unfeasible.

A need therefore exists for a method of converting commercial by-product streams of sulfur dioxide to valuable thionyl chloride and phosphorus oxychloride products which are essentially free of unreacted reagents. The present invention addresses that need.

SUMMARY OF THE INVENTION

Briefly describing one aspect of the present invention, there is provided a process for preparing thionyl chloride and phosphorus oxychloride comprising the steps of: (a) recirculating sulfuryl chloride through a reaction loop, the reaction loop including a continuously stirred reservoir and a catalyst for promoting the formation of sulfuryl chloride; (b) dissolving chlorine into the sulfuryl chloride being recirculated through the reaction loop; (c) dissolving a fluctuating flow sulfur dioxide into the sulfuryl chloride being recirculated through the reaction loop; (d) continuously circulating the sulfuryl chloride containing dissolved chlorine and dissolved sulfur dioxide through the reaction loop for a time and at a temperature effective to convert substantially all of the sulfur dioxide to sulfuryl chloride; (e) reacting phosphorus trichloride with a stoichiometric deficient amount of the sulfuryl chloride formed in step (d) to produce a first mixture of thionyl chloride, phosphorus oxychloride, and phosphorus trichloride; and (f) contacting the first mixture of thionyl chloride, phosphorus oxychloride, and phosphorus trichloride with the amounts of sulfur dioxide and chlorine necessary to convert the phosphorus trichloride in the first mixture to thionyl chloride and phosphorus oxychloride, thereby providing a second mixture consisting of thionyl chloride and phosphorus oxychloride, the second mixture being essentially free of phosphorus trichloride or sulfuryl chloride.

Briefly describing another aspect of the present invention, there is provided a process for simultaneously preparing thionyl chloride and phosphorus oxychloride comprising the steps of: (a) recirculating thionyl chloride and phosphorus oxychloride through a reaction loop, the reaction loop including a continuously stirred reservoir and a reaction zone; (b) dissolving a fluctuating flow of sulfur dioxide into the thionyl chloride and phosphorus oxychloride being recirculated through the reaction loop; (c) introducing phosphorus trichloride and chlorine into the thionyl chloride and phosphorus oxychloride being recirculated through the reaction loop, the phosphorus trichloride and chlorine introduced in about stoichiometric amounts for reaction with the sulfur dioxide present from step (b); and (d) recirculating the reaction mixture through the reaction loop for a time and at a temperature effective to convert substantially all of the phosphorus trichloride, chlorine, and sulfur dioxide to phosphorus oxychloride or thionyl chloride.

BRIEF DESCRIPTION OF THE DRAWINGS

In the accompanying drawings, forming a part of this specification, and in which like numerals are employed to designate like parts throughout the same.

DESCRIPTION OF THE PREFERRED EMBODIMENT

For the purposes of promoting an understanding of the principles of the invention, reference will now be made to the preferred embodiments and specific language will be used to describe the same. It will nevertheless be understood that no limitation of the scope of the invention is thereby intended, such alterations and further modifications in the illustrated process, and such further applications of the principles of the invention being contemplated as would normally occur to one skilled in the art to which the invention relates.

The present invention relates to the use of sulfur dioxide, particularly from a waste stream, to prepare thionyl chloride and phosphorus oxychloride. Initially, sulfuryl chloride is recirculated through a reaction loop. The loop begins at a continuously stirred reservoir, runs through a catalyst containing region, and returns to the reservoir. Next, chlorine and waste stream sulfur dioxide contact each other within the reaction loop under reaction conditions effective to produce sulfuryl chloride. Because the chlorine and sulfur dioxide are reacted in a continuously recirculating loop of sulfuryl chloride, the process is able to accommodate a fluctuating supply of sulfur dioxide. Excess sulfur dioxide dissolves in the sulfuryl chloride to be consumed later by controlled additions of chlorine.

Figure 1:
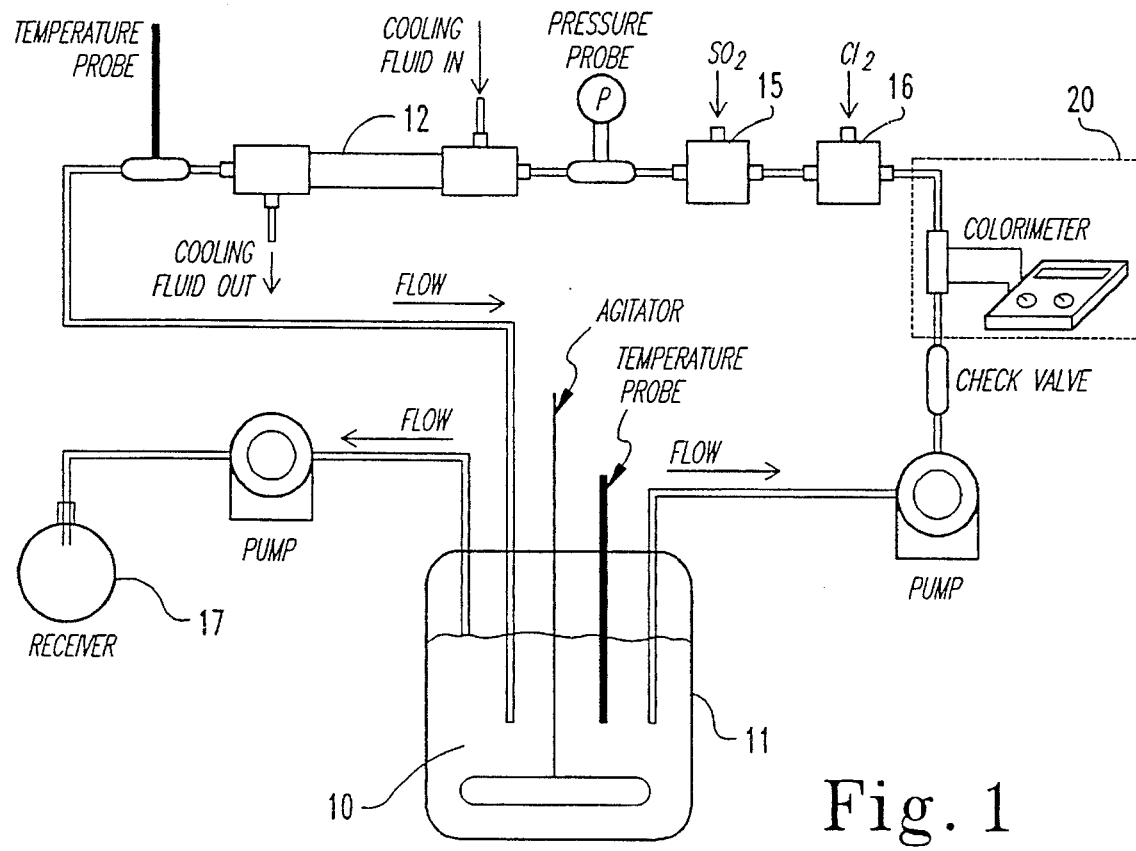
FIG. 1 is a process flow diagram for a process to react sulfur dioxide and chlorine.

Referring now to the drawings, FIG. 1 shows an initial supply of sulfuryl chloride 10 charged within continuously stirred reservoir 11. The sulfuryl chloride is then continuously recirculated through a recirculation loop. The recirculation loop is formed by pumping $SO_2Cl_2$ from reservoir 11, through a catalyst in catalyst bed 12, and back to reservoir 11. Contacting each other within catalyst bed 12 are $SO_2$ and $Cl_2$. Preferably, $SO_2$ and $Cl_2$ are injected into the recirculation loop upstream of catalyst bed 12 as shown in FIG. 1 at 15 and 16. This injection location allows the gases to dissolve in $SO_2Cl_2$ before entering catalyst bed 12. Within the bed, the catalyst accelerates the reaction between $SO_2$ and $Cl_2$ to form additional $SO_2Cl_2$. A substantial level of $SO_2Cl_2$ is preferably maintained within reservoir 11, for example, by means of an overflow or a continuous take-off to receiver 17, and most preferably, the level remains constant to provide a consistent residence time within reservoir 11.

The reaction between $Cl_2$ and $SO_2$ can be at any appropriate temperature. However, it is preferable to cool catalyst bed 12 as a cooler bed typically accelerates the exothermic reaction. A jacket around the bed's exterior, through which a temperature-controlling fluid can be circulated, is generally sufficient to lower the temperature within the catalyst bed. A typical temperature range is 0° C. to 30° C.; however, the preferred operating range depends in part on the specific catalyst chosen.

The catalyst can be any material which will catalyze the reaction between $SO_2$ and $Cl_2$. Examples of suitable catalysts include silica gels and activated carbon, with activated carbon being preferred.

As stated, the process allows for fluctuations in the relative $SO_2$ or $Cl_2$ feed rates by dissolving any excess gases in $SO_2Cl_2$ and repeatedly passing them through the catalyst bed until the appropriate stoichiometry between $SO_2$ and $Cl_2$ is obtained. This aspect of the invention is important if the $SO_2$ supply originates from the off-gas of a chemical process. Excess $SO_2$ can be absorbed for later reaction with $Cl_2$.

Colorimeter 20 is an example of a device which can be used to regulate the flow of $Cl_2$ into the system. If excess chlorine is present, the liquid will typically be of a greenish yellow color which can signal the stop of chlorine gas flow.

In a second aspect of the present invention, the sulfuryl chloride, prepared above, is converted to thionyl chloride and phosphorus oxychloride. Although methods for producing $SOCl_2$ and $POCl_3$ are known, prior art methods routinely leave unreacted reagents in the product. These unreacted reagents are typically difficult and expensive to remove due to the similar boiling points of the reagents and products involved. For example, the boiling point of sulfuryl chloride is 69° C., phosphorus trichloride 76° C., thionyl chloride 79° C., and phosphorus oxychloride 107° C.

The present invention overcomes the problem associated with unreacted reagents by initially contacting the phosphorus trichloride with a stoichiometrically deficient amount of the sulfuryl chloride. The deficiency produces a first mixture of thionyl chloride, phosphorus oxychloride, and excess phosphorus trichloride. The excess phosphorus trichloride is then converted to thionyl chloride and phosphorus oxychloride by reacting the excess with stoichiometric amounts of sulfur dioxide and chlorine. The use of stoichiometric amounts consumes the remaining phosphorus trichloride and produces a second mixture consisting of thionyl chloride and phosphorus oxychloride with little, if any, unreacted reagents.

Figure 2:
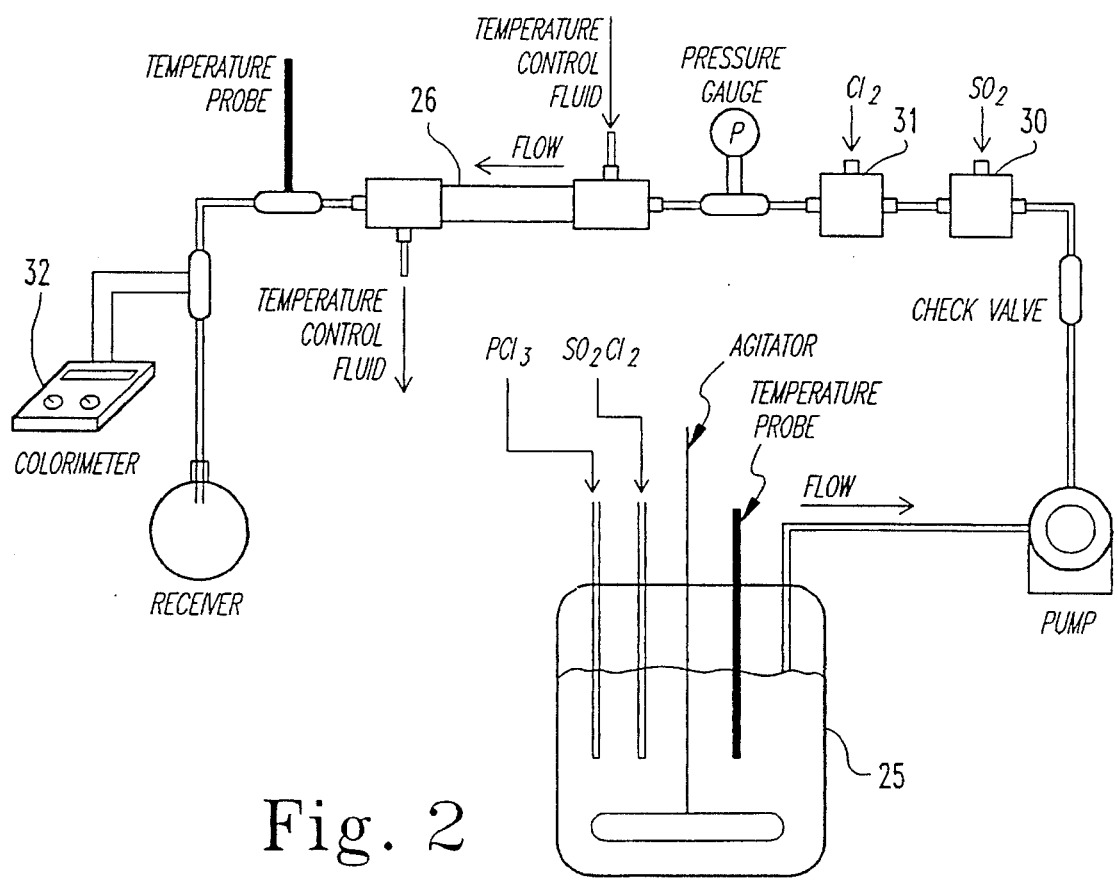
FIG. 2 is a process flow diagram for a process to react sulfur dioxide, chlorine, phosphorus trichloride, and sulfuryl chloride.

Referring to FIG. 2, continuously stirred tank reactor 25 is placed in series with plug-flow reactor 26. Initially, reactor 25 is loaded with a stoichiometrically deficient amount of $SO_2Cl_2$ as compared to the mass of $PCl_3$ loaded. The deficiency does not need to be large, for example, an acceptable charge of $SO_2Cl_2$ can range from about 0.80 to about 0.99 equivalents. Preferably, about 0.93 to about 0.97 equivalents are used. Accordingly, 1.0 equivalent weight of $PCl_3$ is also loaded into reactor 25 and the reaction between $PCl_3$ and $SO_2Cl_2$ is allowed to proceed to completion as the reaction mixture is continuously stirred.

Virtually all of the $SO_2Cl_2$ is consumed in the reaction and a first mixture of $SOCl_2$, $POCl_3$ and unreacted $PCl_3$ remains. The first mixture is then pumped from reactor 25 and contacted at 30 and 31 with the amount of $SO_2$ and $Cl_2$ necessary to react with the remaining $PCl_3$. For example, if 0.95 equivalents of $SO_2Cl_2$ was initially loaded with 1.0 equivalent of $PCl_3$, then 0.05 equivalents of $SO_2$ and $Cl_2$ are added to the first mixture to react with the 0.05 equivalents of unreacted $PCl_3$ that remains.

The crude product containing $PCl_3$, $SO_2$, and $Cl_2$ is then passed through plug-flow reactor 26. The plug-flow reactor design can be any that allows for the reaction of $PCl_3$, $SO_2$, and $Cl_3$ into $SOCl_2$ and $POCl_3$. The temperature of this reaction mixture can be any temperature at which the reaction will occur.

This secondary reaction step should consume all the remaining $PCl_3$ within the crude product. In-line colorimeter 32 is typically used for fine adjustment of the $Cl_2$ and $SO_2$ ratio in comparison to the $PCl_3$ present by measurement of the relative percent transmission of 425 nm light through the product stream. When the stoichiometry of $Cl_2$ ($SO_2$) to $PCl_3$ is exact, the product formed is colorless to very pale yellow. If $Cl_2$ is present in excess, a yellow-green color is observable and measurable as a decrease in relative percent transmission of 425 nm wavelength light. In this manner, $SOCl_2$ and $POCl_3$ are synthesized virtually free of $PCl_3$ and $SO_2Cl_2$.

In an alternative embodiment of the present invention, waste stream sulfur dioxide is reacted with chlorine and phosphorus trichloride to directly produce thionyl chloride and phosphorus oxychloride. The thionyl chloride and phosphorus oxychloride is prepared by recirculating an initial supply of these compounds through a reaction loop. The loop begins at a continuously stirred reservoir, runs through, a reaction zone, and returns to the reservoir. Next, chlorine, waste stream sulfur dioxide, and phosphorus trichloride are contacted within the reaction zone under reaction conditions effective to produce thionyl chloride and phosphorus oxychloride. Because the chlorine, sulfur dioxide, and phosphorus trichloride are reacted in a continually recirculating loop of thionyl chloride and phosphorus oxychloride, the process is able to accept a fluctuating supply of sulfur dioxide. Excess sulfur dioxide dissolves in the thionyl chloride and phosphorus oxychloride to be consumed later by controlled additions of chlorine and phosphorus trichloride.

Figure 3:
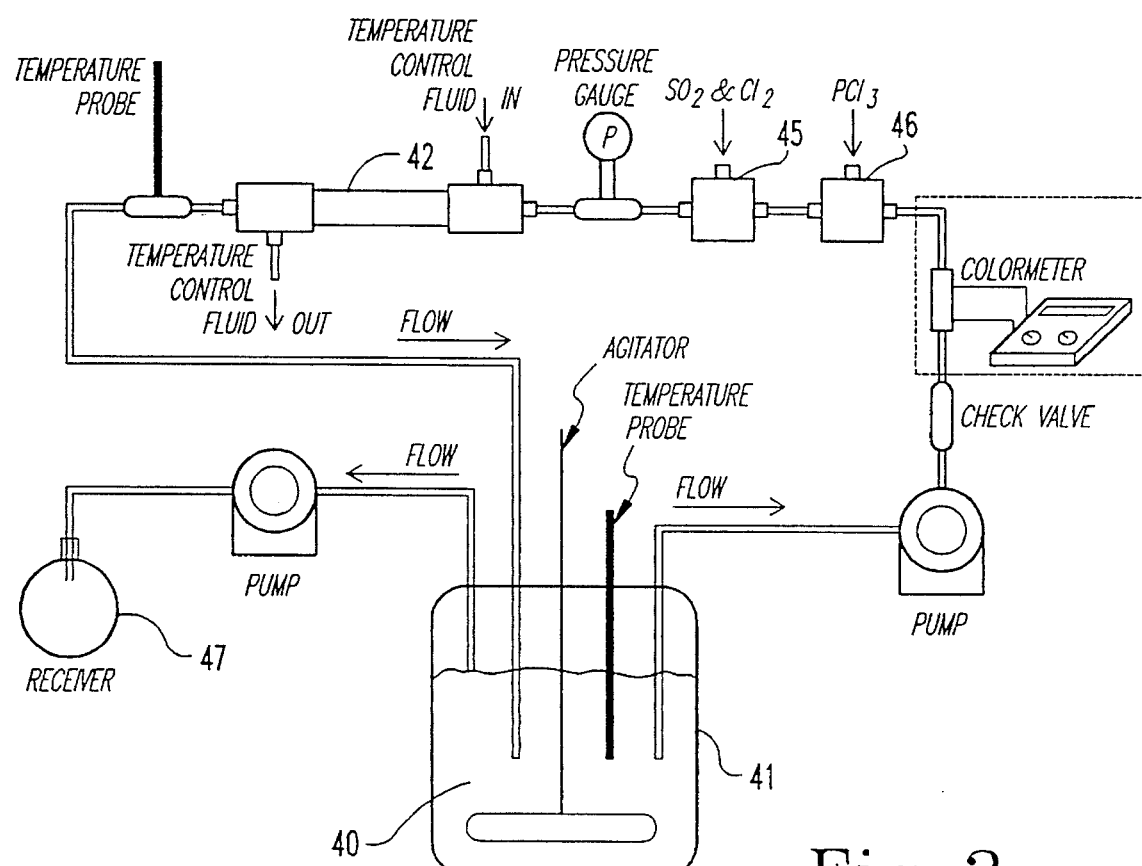
FIG. 3 is a process flow diagram for a process to react sulfur dioxide, chlorine, and phosphorus trichloride.

Referring to FIG. 3, an initial mixture 40 of $SOCl_2$ and $POCl_3$ is charged within continuously stirred reservoir 41. Mixture 40 is then continuously recirculated through a reaction loop creating a reactant stream. The reaction loop is formed by pumping the reactant stream from reservoir 41, through temperature controlled reaction zone 42, and back to reservoir 41. Contacting each other within reaction zone 42 are $SO_2$, $Cl_2$, and $PCl_3$. Preferably, $SO_2$, $Cl_2$, and $PCl_3$ are injected into the recirculation loop upstream of reaction zone 42 as shown in FIG. 3 at 45 and 46. This injection location allows the gasses to dissolve in the reactant stream before entering reaction zone 42. The reactant stream then passes through temperature controlled reaction zone 42 to accelerate the reaction between the reactants. The temperature of this reaction mixture can be any temperature at which the reaction will occur.

Reaction zone 42 can be of any design to facilitate the reaction of the reaction mixture. For example, reaction zone 42 may be a heat exchanger or a jacketed static mixer. The actual design will vary with the desired volume and temperature of the reactants chosen. Within the reaction zone, the reaction between $PCl_3$, $SO_2$, and $Cl_2$ accelerates to form additional $SOCl_2$ and $POCl_3$. A level of $SOCl_2$ and $POCl_3$ is preferably maintained within reservoir 41, for example, by means of an overflow or a continuous take-off to receiver 47 as shown in FIG. 3. Most preferably, the liquid level within reservoir 41 remains constant and allows for a residence time appropriate to assure that the reaction goes to completion.

In this system, an in-line colorimeter is preferably used to make fine adjustments in the relative reagent addition rates. When the stoichiometry of $Cl_2$ and $SO_2$ to $PCl_3$ is exact, the product formed is colorless to very pale yellow. If $Cl_2$ is present in excess, a yellow-green color is observable and measurable as a decrease in relative percent transmission of 425 nm wavelength light. Thus, with the $SO_2$ addition rate always equal to or greater than the $Cl_2$ rate, the feedback from the colorimeter can be used to assure that all $PCl_3$ will be reacted. An excess of $SO_2$ or chlorine will not result in the formation of $SO_2Cl_2$ under these reaction conditions, and thus, a $POCl_3$ and $SOCl_2$ product will form that does not contain any $PCl_3$ or $SO_2Cl_2$ impurities. This is important because $PCl_3$ (bp 76° C.) and $SO_2Cl_2$ (bp 69° C.) are difficult to remove from $SOCl_2$ (bp 76° C.) by simple distillation.

$SOCl_2$ and $POCl_3$ mixtures synthesized by the methods disclosed in the present invention can be separated via continuous distillation. However, such distillation techniques are not contemplated by the present invention.

EXAMPLE 1

Gas Phase Reaction of $SO_2$ and $Cl_2$ over Activated Carbon

A 10 foot long by 0.4 inch ID stainless steel reactor was packed with Barnebey-Sutcliffe BD grade carbon. This reactor was completely submerged in a controlled temperature water bath. $SO_2$ and $Cl_2$ were mixed at room temperature and passed through the reactor at an inlet pressure of approximately 25 inches of water (above atmospheric). The $Cl_2$ flow rate was adjusted to 0.010±0.003 moles/min, and $SO_2$ was maintained at a 40% to 200% molar excess to the $Cl_2$. The reaction effluent was passed first through a trap cooled to 0° C. with ice/water, then through a −70° C. trap cooled with IPA/CO$_2$, and finally through an oversized caustic scrubber. The activated carbon was conditioned by saturating it with $SO_2$ and $Cl_2$ at the reaction temperatures prior to all reactions. Experiments performed at 79° C. yielded 7% to 10% $SO_2Cl_2$ as identified by IR spectroscopy. Experiments at 98° C. yielded 11% to 15% $SO_2Cl_2$.

EXAMPLE 2

Room Temperature Reaction of $SO_2$ and $Cl_2$ Over Activated Carbon.

A 12 inch long by 0.5 inch ID glass condenser was packed with Barnebey-Sutcliffe BD grade carbon. The reactor was cooled with tap water (approx. 15° to 20° C.) circulated through the condenser jacket. $SO_2$ and $Cl_2$ were mixed at room temperature and passed through the reactor at atmospheric pressure. Liquid product was collected in a flask cooled to 0° C., and excess gases were passed through a −70° C. trap which vented to a caustic scrubber. A reaction performed with equivalent $Cl_2$ and $SO_2$ flow rates of 0.010 mol/min allowed a quantitative recovery of $SO_2Cl_2$. At the flow rate of 0.012 mol/min a yield of 82% was obtained, and at 0.030 mol/min a 74% yield was obtained. The products were identified by IR spectroscopy.

EXAMPLE 3

Comparison of Coal Based Activated Carbon to Coconut Shell Carbon in the Synthesis of $SO_2Cl_2$ Experimental conditions were the same as those described in above Example 2 except that Calgon SPG 12×40 activated carbon was used instead of Barnebey-Sutcliffe BD grade carbon. A reaction performed with $Cl_2$ and $SO_2$ flow rates of 0.012 mol/min resulted in 98% yield of $SO_2Cl_2$ product. With the flow rates at 0.030 mol/min a 78% yield was obtained. The products were identified by IR spectroscopy.

EXAMPLE 4

Synthesis of $SO_2Cl_2$ using $SO_2$ from the off-gas of a Commercial Reaction Process A 20 lb cylinder of $SO_2$ collected from the off-gas of a commercial reaction process was acquired. The liquid assay included with this cylinder indicated 99.3% $SO_2$, 0.7% $Br_2$, and 0.04% NVR. In order to remove the bromine impurity, the $SO_2$ was passed through a pre-filter of activated carbon (14×0.4 inch packed, water cooled column) prior to mixing with chlorine. The mixed gases were passed through a 12 inch long by 0.5 inch ID glass condenser packed with Calgon SPG 12×40 grade activated carbon. The condenser was jacketed and cooled using a controlled temperature circulating bath set at 0° C. In separate experiments, the $SO_2$ and $Cl_2$ flow rates were set at 0.332 SLPM (0.015 mol/min) and 0.664 SLPM (0.030 mol/min using Sierra Instrument Co. mass-flow controllers. Product was collected in a round-bottomed flask equipped with a bottom drain which vented through a condenser to a −70 C. cooled trap and then to an oversized caustic scrubber. In these experiments, 93% and 95% product yields were obtained respectively based upon the total amount of gas registered by the flow meters. No liquid or gas product was collected in the −70° C. trap in either experiment. $SO_2Cl_2$ was identified by IR spectroscopy. A $Br_2$ content of less than 2 ppm in the $SO_2Cl_2$ was determined by XRF spectroscopy.

EXAMPLE 5

Determination of the Efficiency and Temperature Dependence of Carbon Catalyst Activity in the Synthesis of $SO_2Cl_2$ A series of experiments was conducted using the same experimental setup as that described in Example 4. Mixtures of $SO_2$ (from a commercial reaction process) and $Cl_2$ gases were passed over a 12×0.5 inch tubular reactor packed with approximately 14 grams of Calgon SPG activated carbon which was cooled at 0° C. At this temperature, comparison was made of the product yield with the $Cl_2$ and $SO_2$ gas flow rates set at 0.332 SLPM (0.015 mol/min), 0.664 SLPM (0.030 mol/min) and 1.000 SLPM (0.045 mol/min). Collected product yields of 93%, 95%, and 97% respectively were recorded under these conditions. The temperature of the recirculating bath on the reactor jacket was then raised to 25° C. and the experiment was mol/min). Once again a 97% collected yield was recorded, although it was noted that the color of this product was darker yellow than the same sample formed at 0° C. The 12×0.5 inch reactor was then replaced with a 3.5×0.5 inch reactor which was packed with 4 grams of carbon. With the circulating bath set at 25° C., a 96% product yield was collected with the $SO_2$ and $Cl_2$ flow rates set at 0.334 SLPM (0.015 mol/min) and a 77% yield was obtained at the flow rate of 0.668 SLPM (0.030 mol/min). With the same 3.5×0.5 inch reactor cooled to 0° C., a 95% product yield was obtained with the gas flow rates set at 0.668 SLPM (0.030 mol/min). All product samples were identified as $SO_2Cl_2$ by IR analysis. The results of this experiment are tabulated below.

| Temp. (°C.) | Amt. C (g) | Prod. Rate (g/min) | % Yield | Color |
|---|---|---|---|---|
| 0 | 12 | 2 | quant. | pale yellow |
| 0 | 12 | 4 | quant. | pale yellow |
| 0 | 12 | 6 | quant. | pale yellow |
| 25 | 12 | 6 | quant. | yellow |
| 25 | 4 | 2 | quant. | yellow |
| 25 | 4 | 4 | 80% | dark yellow |
| 0 | 4 | 4 | quant. | dark yellow |

EXAMPLE 6

Continuous Synthesis of $SO_2Cl_2$ Utilizing a Continuously Stirred Loop Reactor (CSLR)

A 500 ml, 5-necked flask was equipped with a stirrer, a thermometer, a condenser which vented through a −70° C. cold trap to a caustic scrubber, a height-adjustable dip-tube connected through a Masterflex pump with viton tubing to a bottom drained receiving flask (also vented through the −70° C. cold trap to a caustic scrubber), and recirculating loop. The recirculating loop was made as follows, the components being connected by TEFLON® tubing. A dip tube was connected to an all teflon diaphragm pump head (Cole Parmer model 7090-62). Following the pump was a check valve, a sampling port, a 0–30 psi pressure gauge with a TEFLON® gauge protector, a 12 inch long by 0.4 inch ID inconel tube packed with 12 grams of Calgon SPG 12×40 activated carbon and jacketed with a 1 inch OD stainless steel tube, an inconel thermocouple well, and a final teflon dip tube for the return feed. Both dip tubes were placed in a continuously stirred flask reservoir of $SO_2Cl_2$.

The $SO_2$ and $Cl_2$ flows were controlled using Sierra Instruments Co. mass flow controllers. The gases were mixed and introduced to the loop through the sampling port. The Cole Parmer teflon pump head was connected to a 0–60 Hz Masterflex drive, and the output calibrated with water over its full range. The jacketed carbon bed was connected to a thermally controlled, recirculating bath (Neslab model RTE-110).

A constant volume of 200 mls of $SO_2Cl_2$ was maintained in the flask at room temperature (24° C.), and a continuous recirculation through a loop was established at 25 mls/min. The $SO_2$ (from a commercial reaction process) and $Cl_2$ flow rates were set at 1.000 SLPM (0.045 moles/min), and the circulating bath on the carbon bed was set at 10.0° C. Under these conditions, the temperature of the product stream in the loop directly after the carbon bed was 20.6° C., and the pressure before the carbon bed was 1 psi. The average residence time for the product in the CSLR was 56 minutes, which translates to seven passes through the carbon bed per turnover of the reactor volume. In separate trials, 96% and 89% product yields were obtained. The deficit from 100% was believed to be due to absorption of $SO_2Cl_2$ into the viton tubing of the take-off line. The liquid product was identified as $SO_2Cl_2$ by IR spectroscopy.

The continuous reaction was operated for a period of 5 minutes with the $SO_2$ flow set at 1.00 SLPM and $Cl_2$ flow off. The $SO_2$ flow was then turned off and $Cl_2$ flow set at 1.00 SLPM for an equivalent period to compensate for the excess of $SO_2$. During this period, no $SO_2$ or $Cl_2$ was collected in the −70° C. trap, indicating that the system readily absorbed the fluctuation in gas flow rates, allowing them to be recycled and reacted.

EXAMPLE 7

Determination of Carbon Catalyst Lifetime in the Synthesis of $SO_2Cl_2$ using a CLSR The experimental setup and conditions were identical to that described in Example 6 above, with the addition of a quartz flow-through microcuvette (1 cm path length) placed in the loop after the check valve and before the gas inlet port. The microcuvette was positioned in the cell holder of a Sequoia-Turner model 340 spectrophotometer which was set at 425 nm wavelength to monitor for yellow color from unreacted chlorine. The carbon bed was packed with 12 grams of fresh Calgon SPG 12×40 activated carbon at the start of the experiment. A heel of 200 mls of $SO_2Cl_2$ was formed through this carbon, and during this time, the spectrophotometer was set at 100% transmission From this point, the percent relative transmission was monitored during the continuous formation of $SO_2Cl_2$. Product was formed at 6 grams/min for 306 minutes (1836 grams total), then the $SO_2$ feed was stopped to allow the product heel to saturate with $Cl_2$. A final transmission reading was then taken. A plot of percent of carbon bed lifetime versus grams of $SO_2Cl_2$ formed per gram of activated carbon was generated with the boundaries of the carbon bed lifetime set at the maximum and minimum percent transmission recorded during the experiment. Linear extrapolation of this plot yielded a value of 450 g/g for the minimum amount of product that can be expected to form per amount of carbon catalyst.

EXAMPLE 8

Batch Synthesis of $SOCl_2$ and $POCl_3$ from $SO_2Cl_2$ and $PCl_3$

The reaction was performed in a 500 ml, 5 necked round-bottom flask equipped with a stirrer, thermometer, addition funnel, nitrogen purge, and a condenser venting to an oversized caustic scrubber. The round-bottom flask was purged with nitrogen for a minimum of 5 minutes, then $PCl_3$ (108 mls, 1.24 moles) was introduced and heated to 68° C. $SO_2Cl_2$ (100 mls, 1.24 moles) was added to the stirred $PCl_3$ over a period of approximately 1 hour, with cooling applied as necessary to maintain the reaction temperature between 70° C. and 80° C. Pot temperature was maintained above 70° C. for 30 minutes after addition of the $SO_2Cl_2$ was complete. GC and IR analysis were then performed to determine if the reaction was complete. FTIR analysis of 2429-10-1 showed no SO$_2$Cl$_2$ or PCl$_3$ in the product. GC assay of 2429-10-1: Actual: 42.9% SOCl$_2$;56.2% POCl$_3$. Theoretical: 43.7% SOCl$_2$;56.3% POCl$_3$.

In a second trial, 30% of the total SO$_2$Cl$_2$ charge was added to the PCl$_3$ at 24° C., and the reaction was allowed to set for 1 hour. After this time, FTIR analysis showed that the SO$_2$Cl$_2$ was partially reacted, proving that reaction can occur at room temperature, but it is relatively slow.

EXAMPLE 9

Mass Balance Reaction of SO$_2$Cl$_2$ with PCl$_3$

The reaction was performed in a 3 liter, 5 necked round-bottom flask equipped with a stirrer, thermometer, addition funnel, nitrogen purge, and a condenser vented to an oversized caustic scrubber. The reactor was purged with nitrogen for at least 5 minutes, then PCl$_3$ (1086 mls, 12.44 moles) was introduced and heated to 65° C. SO$_2$Cl$_2$ (1000 mls, 12.44 moles) was added to the vigorously stirred PCl$_3$ over a period of 2.75 hours with a 40° C. cooling bath applied to maintain the reaction temperature between 65° C. and 75° C. Following complete addition of the SO$_2$Cl$_2$, heat was applied to the reactor to maintain a temperature above 70° C. for an additional hour. The product was analyzed by GC as 43.13% SOCl$_2$; 54.66% POCl$_3$; 0.96% SO$_2$; and 1.24% PCl$_3$. To eliminate the residual PCl$_3$, 25 mls (0.31 moles) of additional SO$_2$Cl$_2$ was added. A total of 3392 grams of product with an assay of 40.97% SOCl$_2$; 57.80% POCl$_3$; and 1.07% SO$_2$ was recovered compared to the theoretical 3389 grams with an assay of 43.7% SOCl$_2$ and 56.3% POCl$_3$.

3372 grams of the crude product were placed into a separate vessel for distillation. The distillation was carried out under 15 inches of vacuum through a vacuum jacketed, 20 tray Oldershaw column. The still head condenser was cooled to −20° C. to −30° C. in an attempt to keep product loses to a minimum. A total of 3166 grams of product were recovered (94% mass balance) in fractions from the distillation, analysis of which showed 102% of theoretical recovery of POCl$_3$, 85% recovery of SOCl$_2$, and 53% of recovery of SO$_2$.

EXAMPLE 10

Continuous Plug-Flow Reaction of SO$_2$, Cl$_2$, and PCl$_3$

SO$_2$ (0.257 SLPM, 0.012 mol/min) and PCl$_3$ (1.0 ml/min, 0.012 mol/min) were mixed together and fed to a 0.4 inch ID inconel tubular reactor consisting of a 12 inch pre-heat zone (heated with heat tape), a 5 inch reaction zone, a 9 inch cooling zone (cooled by a water jacket) and a receiver. The entire reactor was packed with glass helices to provide static mixing (85% void space). The PCl$_3$/SO$_2$ mixture was heated in the pre-heat zone to approximately 65° C., then Cl$_2$ (0.257 SLPM, 0.012 mol/min) was introduced in the reaction zone. The heat generated by reaction (to approx. 85° C.) was controlled in the jacketed "cooling" zone (set at 40°–60° C.), which also allowed for an extended residence time at the reaction temperature. Final product was collected in a receiver (cooled at 0° C.) which was vented through a −70° C. cold trap to an oversized caustic scrubber. The results from these experiments showed that product could be obtained which was free of both PCl$_3$ and SO$_2$Cl$_2$ (analysis by IR and GC).

EXAMPLE 11

Continuously Stirred Tank Reaction (CSTR) of PCl$_3$, SO$_2$, and Cl$_2$

A continuously stirred tank reactor was assembled using a 1 liter, round-bottom flask equipped with a stirrer, thermometer, fritted glass sparge tube, addition funnel with a dip-tube, a water cooled condenser vented to an oversized caustic scrubber, and a height-adjustable dip tube connected via viton tubing through a Masterflex pump to a bottom-drained receiving flask.

A reservoir of SOCl$_2$/POCl$_3$ was established in the reactor. Cl$_2$ and SO$_2$ were mixed and added subsurface through the fitted sparge tube and PCl$_3$ was added subsurface through a dip tube.

| Trial | Reagent Addition Rate | Residence Time (hrs) | Percent Yield |
|---|---|---|---|
| 1 | 0.023 | 2.5 | 93 |
| 2 | 0.034 | 1.7 | 96 |
| 3 | 0.045 | 1.4 | 88 |
| 4 | 0.045 | 0.75 | 99 |

| Trial | % SOCl$_2$ | % POCl$_3$ | % SO$_2$ | % PCl$_3$ | % SO$_2$Cl$_2$ |
|---|---|---|---|---|---|
| 1 | 42.7 | 56.4 | 0.9 | nd | nd |
| 2 | 44.3 | 55.2 | 0.4 | nd | nd |
| 3 | 42.4 | 52.3 | 1.9 | nd | nd |
| 4a | 44.0 | 53.8 | 0.8 | nd | nd |
| 4b | 44.0 | 53.4 | 0.7 | 0.11 | nd |
| 4c | 44.2 | 53.0 | 0.9 | 0.05 | nd |

EXAMPLE 12

Continuously Stirred Loop Reaction (CSLR) of PCl$_3$, SO$_2$, and Cl$_2$

A 500 ml, 5-necked flask was equipped with a stirrer, thermometer, condenser which vented through a −70° C. cold trap to a caustic scrubber, a height-adjustable teflon dip-tube connected with viton tubing through a Masterflex pump to a bottom drained receiving flask (also vented through the −70° C. cold trap to a caustic scrubber), and recirculating loop. The recirculating loop was made of the following components connected by teflon tubing. A teflon dip tube was connected to an all teflon diaphragm pump head (Cole Parmer model 7090-62). Following the pump was a teflon check valve, two teflon sampling ports, a 0–30 psi pressure gauge with a teflon gauge protector, a 12 inch long by 0.4 inch ID inconel tube packed with ⅜ inch glass static mixers (85% void space) and jacketed with a 1 inch OD stainless steel tube; an inconel thermocouple well; and a final teflon dip tube for return of the product to a reservoir. A quartz, flow-through microcuvette was plumbed in-line between the check valve and the reagent inlet ports. This microcuvette was positioned in the sample holder of a uv-vis spectrophotometer set at 425 nm. The SO$_2$ and Cl$_2$ flow levels were controlled using Sierra Instruments Co. mass flow controllers.

The gases were mixed and introduced to the loop through one sampling port, and the PCl$_3$ was metered into the other sample port via a microprocessor controlled syringe pump (Harvard Apparatus model 11). The pump head was connected to a 0–60 Hz Masterflex drive, for which the output was calibrated over its full range using water. The jacket on the static mixer bed was connected to a thermally controlled recirculating bath (Neslab model RTE-110). A constant volume of 200 mls of $SO_2Cl_2$ was maintained in the reservoir flask (an estimate of the loop volume was 50 mls) at a temperature of 68°–70° C. with a controlled temperature water bath set at 72° C. Continuous recirculation through the loop was established at 40 mls/min. The $SO_2$ (from a commercial synthetic process) and $Cl_2$ flow rates were set at 0.561 SLPM (0.025 moles/min), and the $PCl_3$ addition rate was set at 2.18 mls/min (0.025 mol/min). The circulating bath on the static mixer was set at 67° C. Under these conditions, the temperature of the product stream in the inconel reaction zone was maintained between 70° C. and 80° C.

Minor adjustments were made to the $SO_2$ and $Cl_2$ flow rates (always keeping the two rates equal to each other) relative to $PCl_3$, while observing the relative percent transmission of 425 nm light, and this was correlated with GC analysis of the product for the presence or absence of $PCl_3$. In this manner, an exact stoichiometric match between reagent addition rates was quickly achieved. This result emphasizes the advantage of using feedback from the colorimeter to adjust reagent stoichiometrics, since the accuracy of the meters being used for reagent delivery does not have to be relied upon.

Product formed at 4.16 ml/min translates to a residence time of 60 minutes in the system. Typical GC analysis of this product showed 55.97% $POCl_3$, 42.55% $SOCl_2$, 0.67% $SO_2$, and non-detectable $PCl_3$.

EXAMPLE 13

Continuously Stirred Loop Reaction of $PCl_3$ with $SO_2Cl_2$

The setup for this experiment was essentially identical to that described in Example 12 above, with the following exceptions. $PCl_3$ (2.18 ml/min, 0.025 mol/min) and $SO_2Cl_2$ (1.91 ml/min, 0.024 mol/min) were introduced through the two inlet ports in the loop. $SO_2$ (0.028 SLPM, $1.25 \times 10^{-3}$ mol/min) and $Cl_2$ (0.028 SLPM) were mixed and added subsurface to the stirred product reservoir. Initially, the gas flow rates were set to add 0.05 equivalents to the $PCl_3$. However, it was quickly discovered that 0.60 equivalents of $SO_2$ and $Cl_2$ were required to obtain a response on the colorimeter. Analysis of this product by FTIR showed large amounts of unreacted $SO_2Cl_2$.

EXAMPLE 14

Combination CSTR/Plug-Flow Reaction of $PCl_3$ with $SO_2Cl_2$

A 500 ml, 5-necked round-bottom flask was equipped with a stirrer, thermometer, two teflon dip tubes for addition of $PCl_3$ and $SO_2Cl_2$, and a teflon dip tube for continuous take-off of product. The take-off dip tube was connected to a teflon pump head (Cole Parmer model 7090-62) which was connected by ¼ inch teflon tubing in series with a check valve, two sample ports connected to $SO_2$ and $Cl_2$ feeds, a 0–30 psi pressure gauge, a 12 inch long by 0.4 inch ID inconel tube packed with ⅜ inch glass helices (85% void space) and jacketed with a 1 inch OD tube, a thermocouple, and a bottom-drained receiver flask. A quartz, flow-through microcuvette was plumbed in-line following the thermocouple and before the receiver. This flow cell was placed into a uv-vis spectrophotometer to allow measurement of relative percent transmission of 425 nm wavelength light.

$PCl_3$ (2.18 ml/min, 0.025 mol/min) and $SO_2Cl_2$ (1.91 ml/min, 0.024 mol/min) were added subsurface to a stirred heel of product held at a temperature between 74° C. and 77° C. by an external water bath set at 67° C. The $SO_2Cl_2$ used in this experiment was synthesized using the "scrubber" process described above. The $SO_2$ was from a commercial process and was introduced at a variable flow rate. Continuous take-off was established at a rate (approximately 4.1 mls/min) which would maintain the product reservoir volume at 250 mls, dictating a residence time of 60 minutes. $SO_2$ (0.028 SLPM, $1.25 \times 10^{-3}$ mol/min) and $Cl_2$ (0.028 SLPM) were mixed with the take-off stream, and this was passed through the jacketed static mixer for a residence time of 5 minutes. The jacket was heated at 80° C. causing the temperature of the effluent stream to be 52°–55° C. $Cl_2$ and $SO_2$ flow rates were adjusted until a relatively high transmission was recorded by the colorimeter. Under optimum conditions, the product was very pale yellow colored and contained no $PCl_3$ or $SO_2Cl_2$ impurity as analyzed by GC and FTIR spectroscopy.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for preparing thionyl chloride and phosphorus oxychloride, comprising the steps of:

(a) recirculating sulfuryl chloride through a reaction loop, said reaction loop including a reservoir and a catalyst for promoting the formation of sulfuryl chloride;

(b) dissolving chlorine into the sulfuryl chloride being recirculated through the reaction loop;

(c) dissolving sulfur dioxide into the sulfuryl chloride being recirculated through the reaction loop;

(d) continuously circulating the sulfuryl chloride containing dissolved chlorine and dissolved sulfur dioxide through the reaction loop to convert the sulfur dioxide to sulfuryl chloride;

(e) reacting phosphorus trichloride with a stoichiometric deficient amount of the sulfuryl chloride formed in step (d) to produce a first mixture of thionyl chloride, phosphorus oxychloride, and phosphorus trichloride; and (f) contacting said first mixture of thionyl chloride, phosphorus oxychloride, and phosphorus trichloride with sulfur dioxide and chlorine to convert phosphorus trichloride in said first mixture to thionyl chloride and phosphorus oxychloride, thereby providing a second mixture consisting of thionyl chloride and phosphorus oxychloride.

2. The process of claim 1 wherein said catalyst is selected from the group consisting of silica gels and activated.

3. The process of claim 1 wherein said catalyst is activated carbon.

4. The process of claim 1 wherein said catalyst resides in a catalyst bed which is operated from about 0° C. to about 30° C.

5. The process of claim 1 wherein said stoichiometrically deficient amount of sulfuryl chloride is from about 0.80 to about 0.99 equivalents of the phosphorus trichloride present.

6. The process of claim 1 wherein said stoichiometrically deficient amount of sulfuryl chloride is from about 0.93 to about 0.97 equivalents of the phosphorus trichloride present.

7. The process of claim 1 wherein said reservoir is continuously stirred.

8. The process of claim 1 wherein said circulating step is for a time and at a temperature effective to convert substantially all of the sulfur dioxide and chlorine to sulfuryl chloride.

9. The process of claim 1 wherein said contacting step, said sulfur dioxide and said chlorine are provided in stoichiometric amounts to react with the phosphorus trichloride in said first mixture, whereby said second mixture is essentially free of phosphorus trichloride or sulfuryl chloride.

10. A process for preparing sulfuryl chloride, comprising the steps of:
   (a) recirculating sulfuryl chloride through a reaction loop, said reaction loop including a reservoir and a catalyst for promoting the formation of sulfuryl chloride;
   (b) dissolving chlorine into the sulfuryl chloride being recirculated through the reaction loop;
   (c) dissolving sulfur dioxide into the sulfuryl chloride being recirculated through the reaction loop; and
   (d) continuously circulating the sulfuryl chloride containing dissolved chlorine and dissolved sulfur dioxide through the reaction loop for a time and at a temperature effective to convert substantially all of the sulfur dioxide and chlorine to sulfuryl chloride.

11. The process of claim 10 wherein said catalyst is selected from the group consisting of silica gels and activated carbon.

12. The process of claim 10 wherein said catalyst is activated carbon.

13. A process for preparing thionyl chloride and phosphorus oxychloride, comprising the steps of:
   (a) recirculating thionyl chloride and phosphorus oxychloride through a reaction loop, said reaction loop including a reservoir and a reaction zone;
   (b) dissolving a fluctuating amount of sulfur dioxide into the thionyl chloride and phosphorus oxychloride being recirculated through the reaction loop;
   (c) introducing phosphorus trichloride and chlorine into the thionyl chloride and phosphorus oxychloride being recirculated through the reaction loop, said phosphorus trichloride and chlorine introduced in about stoichiometric amounts for reaction with the sulfur dioxide present from step (b); and (d) recirculating the reaction mixture through the reaction loop for a time and at a temperature effective to convert the phosphorus trichloride, chlorine, and sulfur dioxide to phosphorus oxychloride or thionyl chloride.

14. The process of claim 13 wherein said reaction zone is maintained at about 50° C. to about 90° C.

15. The process of claim 13 wherein the reservoir is continuously stirred.

* * * * *

UNITED STATES PATENT AND TRADEMARK OFFICE
CERTIFICATE OF CORRECTION

PATENT NO. : 5,498,400
DATED : March 12, 1996
INVENTOR(S) : John E. Hill

It is certified that error appears in the above-indentified patent and that said Letters Patent is hereby corrected as shown below:

In item 54 of the title page, please change "OXYHLORIDE" to --OXYCHLORIDE--.
In item 57 of the title page, line 7, change "PCI$_1$ to --PCI$_3$--.
In block 57 of the title page, line 10, change "PCI$_{13}$" to --PCI$_3$--.
In column 1, line 2, change "OXYHLORIDE" to --OXYCHLORIDE--.
In column 4, line 44, pleasse delete the second comma.
In column 7, line 5, after "was" insert: --repeated with SO$_2$ and Cl$_2$ flowrates of 1.000 SLPM (0.045--.
In column 8, line 36, add a period after "transmission".
In column 9, line 41, please delete "of", third occurrence.

Signed and Sealed this

Sixteenth Day of July, 1996

Attest:

Attesting Officer

BRUCE LEHMAN

Commissioner of Patents and Trademarks